V. E. CLARK.
RESILIENT WHEEL.
APPLICATION FILED MAR. 1, 1910.
999,960.
Patented Aug. 8, 1911.
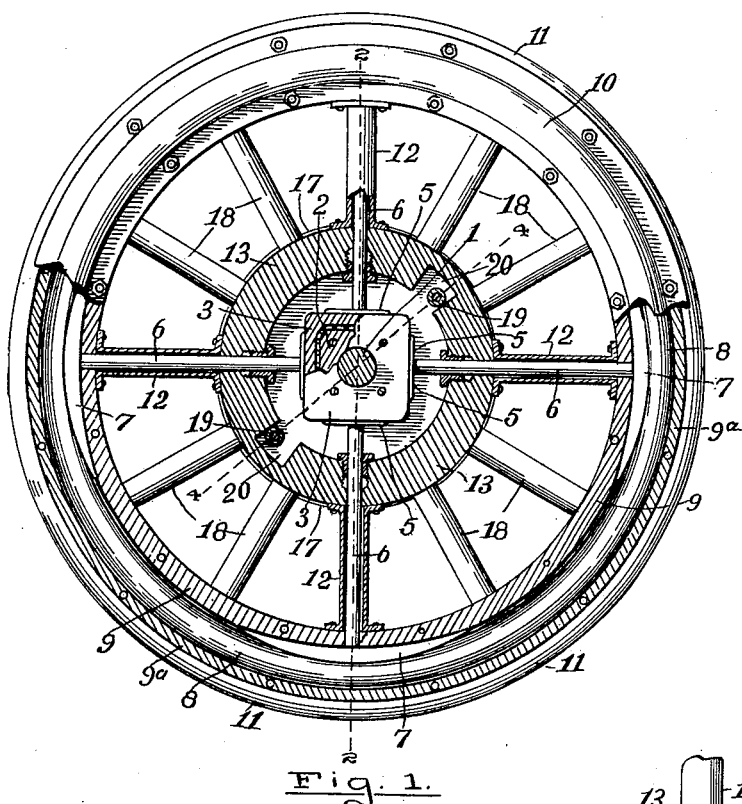
Fig. 1.
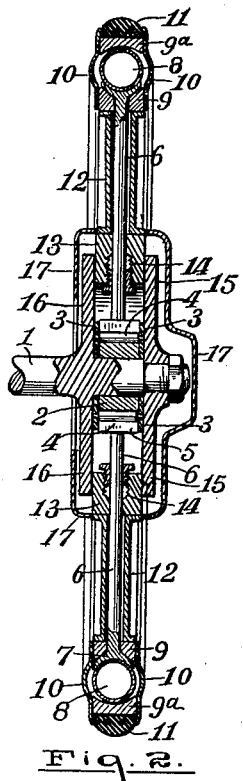
Fig. 2.
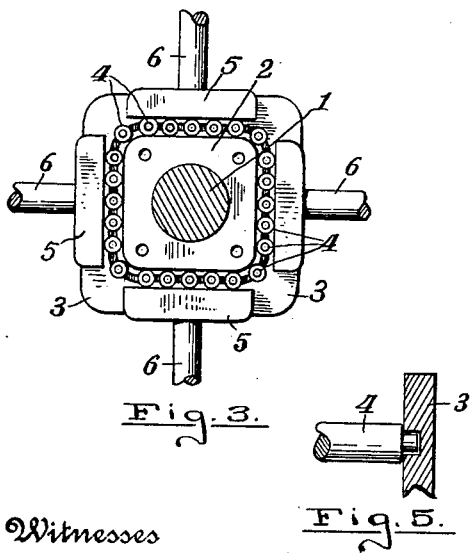
Fig. 3.
Fig. 5.
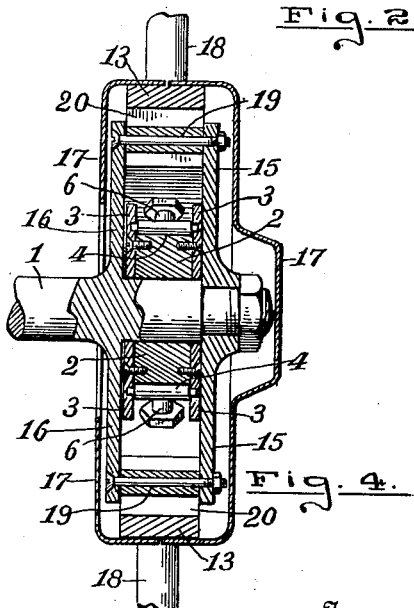
Fig. 4.
Witnesses
H. O. Van Antwerp
Georgiana Chace
Inventor
Victor E. Clark
By Luther V. Moulton
Attorney
COLUMBIA PLANOGRAPH CO., WASHINGTON, D. C.

UNITED STATES PATENT OFFICE.

VICTOR E. CLARK, OF GRAND RAPIDS, MICHIGAN.

RESILIENT WHEEL.

999,960.  Specification of Letters Patent.  Patented Aug. 8, 1911.

Application filed March 1, 1910. Serial No. 546,692.

*To all whom it may concern:*

Be it known that I, VICTOR E. CLARK, a citizen of the United States of America, residing at Grand Rapids, in the county of Kent and State of Michigan, have invented certain new and useful Improvements in Resilient Wheels; and I do hereby declare the following to be a full, clear, and exact description of the invention, such as will enable others skilled in the art to which it appertains to make and use the same.

My invention relates to improvements in resilient wheels and its object is to provide means for adequately protecting the air tube; to provide means for excluding dust and grit, and to provide the device with various new and useful features hereinafter more fully described and particularly pointed out in the claims.

My device consists essentially of a rigid hollow wheel rim having a pneumatic tube inclosed therein, a ring connected to the rim by spokes and movable in a plane at right angles to the axis between two parallel disks rigidly attached to the axle, push rods longitudinally movable in the spokes and having their outer ends provided with segments engaging the tube to support the load thereon, said rods being longitudinally movable in the spokes, and an angular hub fixed on the axle and movably engaging T heads on the inner ends of the radial push rods, and various features of novel construction and arrangement, as will more fully appear by reference to the accompanying drawings, in which:

Figure 1 is a side elevation of a wheel embodying my invention with parts broken away to show the construction; Fig. 2 a vertical section on the line 2—2 of Fig. 1; Fig. 3 an enlarged detail in elevation of the hub and parts adjacent thereto with one of the guide plates removed; Fig. 4 an enlarged inclined section of the inner part of the wheel on the line 4—4 of Fig. 1; and Fig. 5 a further enlarged detail of a portion of a roller and guide plate.

Like numbers refer to like parts in all of the figures.

1 represents the axle of a vehicle on which is a hub 2. This hub is preferably angular on its periphery presenting a plane surface to each of several radially movable push rods 6. At each side of this hub is a guide plate 3 extending beyond the same and each provided with a groove in the side opposite the other plate. Fig. 1 shows this plate broken away only to a vertical plane, cutting the groove in the plate. This groove is suitably spaced apart from the periphery of the hub to receive the journals of a series of rollers which engage the periphery of the hub and roll thereon. T-heads 5 fixed on the inner ends of the push rods 6 have faces parallel with the corresponding faces of the hub, are slidable between the guide plates and held thereby in a plane at right angles to the axis of the wheel. These rollers 4 are free to move around between the hub and the T-heads, and are retained in place by the journals on the respective ends of the rollers traversing in the said grooves in the guide plates. The outer end of each push rod is provided with a segment 7 adapted to engage and rest upon an air tube 8, which latter furnishes a yielding support for these rods and yieldingly supports the hub and axle normally in the axis of the wheel, and permits the hub to move out of the axis and traverse on the T-heads, as occasion requires. This air tube 8 is wholly inclosed within a hollow wheel rim, which consists of an inner rim or felly 9 and an outer rim 9ª spaced apart to receive the air tube therebetween, said rims being rigidly connected by circular plates 10 at the respective sides of the air tube, whereby the latter is wholly inclosed by the two rims and the two plates and the outer rim preferably provided with a solid rubber tire 11. This tube may be readily removed or replaced, as occasion requires, by removing one of the said plates, or if preferred, only a portion of one of the plates may be made removable. This hollow rim containing the air tube 8 is connected to the ring 13 by tubular spokes 12 surrounding the push rods which are slidable therein, the inner ends of the tubular spokes being provided with glands 14 to keep oil from reaching the air tube, and for further strength other spokes 18 connecting the rim and ring are also added. This ring is slidable in a plane at right angles to the axis between disks 15 and 16 rigidly attached to the axle 1 and spaced apart in parallel planes to embrace the ring.

17 is a casing inclosing the ring and disks to retain oil for lubricating the parts inclosed thereby and to keep out dust and sand.

To take off the strains from the push rod, due to driving this wheel by the axle, I prefer to provide the ring with recesses 20, any convenient number of which may be used. Through the recesses bolts 19 extend connecting the disks, which bolts are preferably provided with sleeves to reduce the frictional contact of the same with the walls of the recess. These recesses are large enough to afford clearance between the bolts and walls of the recess to permit the ring to move when the tube 8 yields under the pressure of the shoes and push rod which carry the load on the axle.

What I claim is:—

1. A resilient wheel, comprising a hollow closed rim, a pneumatic tube in the rim, a ring surrounded by the rim, tubular spokes connecting the rim and ring, an angular hub movable within the ring, push rods slidable in the spokes and supporting the hub, segments on the outer ends of the rods engaging the tube, T-heads on the inner ends of the rods, and rollers between the respective T-heads and the respective faces of the hub.

2. A resilient wheel, comprising an angular hub having a number of plane faces, grooved plates at the respective sides of the hub, a series of rollers surrounding the hub and journaled in the grooves of the plate, radially movable push rods, a rim provided with a yieldable support for said rods, T-heads on the rods opposite the respective faces of the hub and engaging the rollers, a ring surrounding the hub in which the rods are slidable and spokes connecting the rim and ring.

In testimony whereof I affix my signature in presence of two witnesses.

VICTOR E. CLARK.

Witnesses:
GEORGIANA CHACE,
LUTHER V. MOULTON.

Copies of this patent may be obtained for five cents each, by addressing the "Commissioner of Patents, Washington, D. C."